(12) United States Patent
Köster et al.

(10) Patent No.: US 12,403,964 B2
(45) Date of Patent: Sep. 2, 2025

(54) PRIMARY COUPLING APPARATUS, SECONDARY COUPLING APPARATUS, FIFTH-WHEEL COUPLING ARRANGEMENT AND AUTOMATIC COUPLING SYSTEM

(71) Applicant: SAF-HOLLAND GmbH, Bessenbach (DE)

(72) Inventors: Mario Sebastian Köster, Bodman-Ludwigshafen (DE); Randy Kübler, Gottmadingen (DE)

(73) Assignee: SAF-HOLLAND GmbH, Bessenbach (DE)

( * ) Notice: Subject to any disclaimer, the term of this patent is extended or adjusted under 35 U.S.C. 154(b) by 541 days.

(21) Appl. No.: 17/906,803

(22) PCT Filed: Mar. 17, 2021

(86) PCT No.: PCT/EP2021/056761
§ 371 (c)(1),
(2) Date: Sep. 20, 2022

(87) PCT Pub. No.: WO2021/191008
PCT Pub. Date: Sep. 30, 2021

(65) Prior Publication Data
US 2023/0211837 A1    Jul. 6, 2023

(30) Foreign Application Priority Data
Mar. 24, 2020 (DE) .................... 10 2020 108 004.2

(51) Int. Cl.
*B62D 53/12* (2006.01)
(52) U.S. Cl.
CPC .................................. *B62D 53/12* (2013.01)

(58) Field of Classification Search
CPC ...... B62D 53/12; B62D 53/125; B62D 53/08; B60D 1/64; B60D 1/01; B60D 1/015; B60D 1/00; B60D 1/62; B60D 1/58; B60D 1/60
See application file for complete search history.

(56) References Cited

U.S. PATENT DOCUMENTS

| | | | |
|---|---|---|---|
| 4,156,551 A | 5/1979 | Nagase et al. | |
| 4,907,815 A * | 3/1990 | Hunger | B62D 53/12 280/436 |

(Continued)

FOREIGN PATENT DOCUMENTS

| | | |
|---|---|---|
| CN | 101565060 B | 10/2012 |
| CN | 108367646 B | 2/2021 |

(Continued)

OTHER PUBLICATIONS

European Patent Office; International Search Report; Jun. 10, 2021, entire document.

*Primary Examiner* — James M Dolak
(74) *Attorney, Agent, or Firm* — Price Heneveld LLP (57) ABSTRACT

A fifth-wheel coupling arrangement includes a primary coupling apparatus and a fifth-wheel plate that includes a semitrailer surface having an outward-pointing normal, and an insertion opening that extends in an insertion direction, the primary coupling apparatus includes a main body, a drive mechanically connected to a cover apparatus via a coupling mechanism, and a plug element having energy conducting contacts that point in a plug-in direction, wherein the cover apparatus includes a cover element displaceable by the drive between a first position where the plug element is exposed, and a second position where the plug element is covered, and wherein the insertion direction is substantially parallel to the plug-in direction.

17 Claims, 4 Drawing Sheets

(56) References Cited

U.S. PATENT DOCUMENTS

| | | | | |
|---|---|---|---|---|
| 7,959,178 B2 * | 6/2011 | Alguera | ................ | B60D 1/363 |
| | | | | 280/421 |
| 8,052,163 B2 * | 11/2011 | Alguera | .............. | B62D 53/125 |
| | | | | 280/421 |
| 8,465,041 B2 * | 6/2013 | Riibe | ....................... | B60D 1/64 |
| | | | | 280/433 |
| 9,085,208 B1 * | 7/2015 | Riibe | ..................... | B60D 1/015 |
| 9,327,782 B2 * | 5/2016 | Alldredge | .............. | B62D 53/08 |
| 11,001,317 B2 * | 5/2021 | Metternich | .......... | B62D 53/125 |
| 11,420,691 B2 * | 8/2022 | Köster | ..................... | B60D 1/64 |
| 11,524,536 B2 * | 12/2022 | Gaufin | ................. | B62D 53/12 |
| 11,530,006 B2 * | 12/2022 | Köster | .................. | B60D 1/015 |
| 11,548,572 B2 * | 1/2023 | Köster | ............... | B62D 53/0842 |
| 11,548,574 B2 * | 1/2023 | Köster | ................ | B62D 53/125 |
| 11,685,450 B2 * | 6/2023 | Hartmann | .............. | B62D 53/08 |
| | | | | 280/434 |
| 11,945,268 B2 * | 4/2024 | Köster | .................... | B60D 1/64 |
| 12,084,131 B2 * | 9/2024 | Köster | .................. | B60D 1/015 |
| 12,172,713 B2 * | 12/2024 | Köster | .................. | B62D 53/10 |
| 12,194,797 B2 * | 1/2025 | Köster | ................ | B62D 53/125 |
| 2007/0114759 A1 * | 5/2007 | Biondi | .............. | B62D 53/0871 |
| | | | | 280/434 |
| 2020/0076139 A1 | 3/2020 | Lehnert et al. | | |

FOREIGN PATENT DOCUMENTS

| | | |
|---|---|---|
| DE | 9316011 U1 | 10/1993 |
| DE | 10155056 A1 | 9/2001 |
| DE | 102014100255 B3 | 2/2015 |
| DE | 202016102707 U1 | 8/2016 |
| DE | 102015226094 A1 | 6/2017 |
| DE | 202017101339 U1 | 6/2017 |
| DE | 102018117584 A1 | 1/2020 |
| GB | 835653 | 5/1960 |

* cited by examiner

PRIMARY COUPLING APPARATUS, SECONDARY COUPLING APPARATUS, FIFTH-WHEEL COUPLING ARRANGEMENT AND AUTOMATIC COUPLING SYSTEM

BACKGROUND OF THE INVENTION

The invention relates to a primary coupling apparatus, in particular for an automatic coupling system, for a commercial vehicle, to a secondary coupling apparatus, in particular for an automatic coupling system, for a commercial vehicle, to a fifth-wheel coupling arrangement and to an automatic coupling system for a commercial vehicle.

Automatic coupling systems are already known from the prior art and are used to implement a flow of energy between a towing vehicle and a semitrailer or trailer. These automatic coupling systems usually have a plug on the towing vehicle side and a socket on the trailer side. In some cases, the plug and the socket also have movable covering elements in order to prevent engagement in the plug or the socket before coupling and to protect these from environmental influences. As a result of the towing vehicle approaching the trailer—during the coupling operation—the socket and the plug are aligned with one another, the movable covering elements are moved, and the plug and the socket are connected to one another, thus enabling energy, in particular a current, to flow from the towing vehicle to the trailer. However, this process of automatically coupling the socket and the plug as a result of the towing vehicle approaching the trailer is relatively prone to faults on account of the high contact forces between the plug and the socket and frequently leads to damage, especially in the case of the covering elements of the plug.

It is therefore the object of the present invention to reduce the contact force during the coupling operation and, at the same time, to protect the plug connector from contamination.

SUMMARY OF THE INVENTION

The invention relates to a primary coupling apparatus of a fifth-wheel coupling arrangement or of a trailer, in particular of a semitrailer, wherein the primary coupling apparatus comprises a main body, a drive, a coupling mechanism, a cover apparatus and a plug element, wherein the main body is designed to be fixed to the fifth-wheel coupling arrangement and/or the trailer, wherein the plug element has energy conducting contacts which point, in particular, in a plug-in direction, wherein the drive is mechanically connected to the cover apparatus via the coupling mechanism, wherein the cover apparatus has at least one cover element, wherein the cover element can be displaced by the drive between a first position and a second position, wherein the plug element is exposed in the first position of the cover element, and wherein the plug element is covered in the second position of the cover element. The primary coupling apparatus is, in particular, a primary coupling apparatus for a commercial vehicle. A commercial vehicle in the sense according to the invention is, in particular, a road vehicle with a permissible total weight of at least 3.51 tonnes, preferably of at least 7.51 tonnes and particularly preferably of at least 15.01 tonnes. In other words, the primary coupling apparatus can be part of an automatic coupling system which serves to automatically connect a trailer vehicle to a towing vehicle in terms of energy and/or information. The primary coupling apparatus according to the invention can be that part of the automatic coupling system which is arranged on the fifth-wheel coupling arrangement, or the primary coupling apparatus can form that part of the automatic coupling system which is arranged/mounted on the trailer, in particular such that it can be pivoted about a kingpin of the trailer. The primary coupling apparatus according to the invention comprises a main body, a drive, a coupling mechanism, a cover apparatus and a plug element. The main body is designed to be fixed to the fifth-wheel coupling arrangement or the trailer. The main body can be fixed, for example reversibly, in particular by means of screws, thus enabling it to be interchanged in a simple manner. For example, if the main body is fixed to the fifth-wheel coupling arrangement, it can be arranged on the fifth-wheel plate. The main body is preferably arranged below the insertion opening of the fifth-wheel plate. The insertion opening of the fifth-wheel plate is the opening into which the kingpin to be coupled on or coupled in is inserted when the kingpin is displaced from an uncoupled position into the coupled position. Here, the insertion opening extends, in particular, in an insertion direction. This insertion direction is, in particular, the direction in which the kingpin moves relative to the fifth-wheel plate during engagement of the kingpin. For example, the insertion opening is the opening of the fifth-wheel plate into which the kingpin is inserted in order to couple the kingpin. The insertion opening is advantageously defined/formed by a space between the coupling horns of the fifth-wheel plate. In this case, the plug-in direction is expediently at least substantially parallel to the insertion direction in order to achieve a particularly compact and operationally reliable primary coupling apparatus. Here, substantially parallel should be understood to mean that the smallest angle enclosed between the two substantially parallel directions is at most 10°, preferably at most 5° and particularly preferably at most 1°. However, it is particularly highly preferred if the substantially parallel directions are exactly parallel. In particular, the main body of the primary coupling apparatus can be configured as a sheet-metal part since this makes it possible to save production costs. In addition to the main body, the primary coupling apparatus also has a plug element. The plug element serves to be connectable and/or connected to a correspondingly designed element, in particular to a plug connector of a secondary coupling apparatus, thus enabling electrical signals and/or information and/or energy to be transmitted between the plug element and the correspondingly designed element. In other words, this can mean that the plug element can form an automatic coupling system with, for example, a plug connector of a secondary coupling apparatus, thus making it possible, in particular, to transmit electrical signals and/or energy and/or information between a towing vehicle and a trailer. For the transmission of information and/or energy, the plug element has, in particular, hydraulic and/or pneumatic and/or electrical energy conducting contacts, wherein these energy conducting contacts are designed, in particular, to be connectable and/or connected to corresponding contacts of a plug connector of a secondary coupling apparatus. The energy conducting contacts of the plug element advantageously extend in the plug-in direction. Advantageously, this plug-in direction is the direction in which—theoretically—the plug element has to move relative to the plug connector in order to implement a plug-in connection. In order to protect the energy conducting contacts against environmental influences, the primary coupling apparatus has a cover apparatus, which has at least one cover element. In this case, the cover element can be a flap or a falling mechanism or a folding mechanism or a lamellar cover unit, in other words the cover element can be of one- or multi-piece design. The cover element of the cover apparatus can be displaced by the drive between a first position and a second position, wherein the plug element is exposed in the first position of the cover element. In other words, this can mean that, in the first position, it is possible to plug a plug connector into the plug element, or a plug-in connection is possible between the plug element and the plug connector of a secondary coupling apparatus. In the second position, the cover element is positioned in such a way that the plug element is covered. In other words, this can mean that, in the second position, the cover element is positioned in such a way that a plug connector of a secondary coupling apparatus cannot be connected to the plug element by plugging it in. In order to move the cover element of the cover apparatus from the first position into the second position and/or from the second position into the first position, the primary coupling apparatus has a drive and a coupling mechanism. In this case, the drive can be, for example, a linear drive, a hydraulic drive or a pneumatic drive, in particular a cylinder. Alternatively, this drive may also be an electric motor. This drive is mechanically connected to the cover apparatus via the coupling mechanism, thus enabling mechanical energy to be transmitted from the drive to the cover apparatus via the coupling mechanism. In this case, by means of this mechanical energy, the cover element of the cover apparatus is or can be displaced from the first into the second position and/or from the second position into the first position. When the drive is designed as a hydraulic or pneumatic cylinder, the coupling mechanism can be a piston rod and/or a piston rod extension, for example. In particular, the coupling mechanism can be of single-part or multi-part design. A single-part design of the coupling mechanism, particularly in the form of a piston rod, results in an apparatus which is particularly capable of bearing mechanical loads. In the case of a multi-part design of the coupling mechanism, a certain compensation and a certain damping effect can be achieved, with the result that the apparatus can both compensate for certain tolerances and/or is capable of providing a high degree of damping. The configuration of the primary coupling apparatus according to the invention ensures that the contact forces during coupling are significantly reduced by the displacement of the cover element (by the drive). It is thereby possible, in particular, to prevent damage to the primary coupling apparatus, particularly to the cover apparatus.

The primary coupling apparatus is expediently configured in such a way that the cover element can be displaced indirectly by the drive. In particular, such that the drive is configured in such a way that it displaces the plug element during an actuation and the plug element displaces or moves the cover apparatus. In other words, the primary coupling apparatus can therefore be configured in such a way that the drive does not directly displace the cover element, but instead does so only indirectly, in particular via the plug element. It is thereby possible, in particular, to dispense with a separate drive for the plug element, thus achieving a low-cost and space-saving and also light primary coupling apparatus.

The drive advantageously has an energy connection. Such an energy connection can be, for example, a current connection, an oil connection and/or an air pressure connection. By providing the energy connection, it is possible to selectively bring about actuation of the drive in order to achieve a displacement of the cover element from the first position into the second position or vice versa and/or in order to displace the plug element relative to the main body, in particular in the plug-in direction. Furthermore, this avoids the need for the drive to have its own heavy energy storage device, and therefore installation space and weight can be saved.

The drive is preferably a pneumatic, an electric or a hydraulic drive. By designing the drive as a hydraulic drive, it is ensured that even large forces can be exerted. When the drive is configured as a pneumatic drive, it is possible to ensure that no environmental contamination takes place, in particular even in the event of leaks. In addition, designing the drive as a pneumatic drive also has the advantage that, in particular, existing (supply) systems of the commercial vehicle (towing vehicle or trailer) can be used to operate the drive. The provision of a hydraulic or pneumatic drive also has the further advantage that, on account of the compressibility of the working media, a certain spring stiffness can be imparted to the drive, thereby making it possible, by means of the spring stiffness of the working fluid, to prevent overloading of the drive and/or of the main body and/or of the plug element. The use of an electric drive likewise makes it possible to employ energy sources, e.g. batteries, of the trailer or the towing vehicle in order to achieve operation of the drive. This results in a particularly low-cost system since the energy supply to the drive can be retrofitted and/or configured in a particularly simple manner.

In a preferred embodiment, the drive is a compressed air cylinder. Design as a compressed air cylinder results in a particularly space-saving primary coupling apparatus, which, moreover, is also not susceptible to leakage with regard to environmental pollution. In addition, the use of a compressed air cylinder makes it possible to move particularly quickly from the first into the second position and to use already existing systems for operating or supplying the drive, such as, for example, compressors and/or compressed air tanks of the towing vehicle or of the trailer.

The primary coupling apparatus advantageously has a second drive. The use of a second drive can serve, for example, to provide a redundant system, thus making it possible for reliable displacement of the cover element from the first position into the second position to continue to take place, even in the event of a drive failure.

The plug element preferably comprises hydraulic and/or pneumatic and/or electrical energy conducting contacts, wherein the energy conducting contacts are designed to be connectable and/or connected to corresponding contacts of a plug connector of a secondary coupling apparatus, wherein the energy conducting contacts preferably extend in the plug-in direction. In other words, the plug element therefore comprises hydraulic and/or pneumatic and/or electrical contacts which can interact and/or be connected to corresponding contacts of a plug connector of a secondary coupling apparatus in such a way that energy and/or information in the form of electrical, pneumatic and/or hydraulic energy can be transmitted from the plug element to the plug connectors and thus, in a later installation position, from the trailer to the towing vehicle or from the towing vehicle to the trailer. In other words, the secondary coupling apparatus with its plug connector therefore forms an automatic plug-in connection system of an automatic coupling system with the primary coupling apparatus, wherein the primary coupling apparatus is arranged on the trailer or on the towing vehicle and the secondary coupling apparatus is arranged correspondingly on the towing vehicle or on the trailer.

The plug element can advantageously be displaced relative to the main body by means of the drive, in particular in the plug-in direction. The possibility of being able to displace the plug element relative to the main body by means of the drive ensures that the actual plugging in or coupling of the plug element to a plug connector of a secondary coupling apparatus can take place independently of the actual process of coupling the trailer to the towing vehicle, and furthermore only a small installation space is required.

The coupling mechanism can advantageously be displaced in the plug-in direction by the drive. Particularly easy and compact actuation of the cover apparatus can thereby be accomplished. For example, this can be achieved by designing the drive as a cylinder, in particular as a double-acting cylinder, and the coupling mechanism forming part of the piston rod of the cylinder or a piston-rod extension. In this case, it is possible, in particular, for the coupling mechanism to connect the drive mechanically to a displacement apparatus of the cover apparatus. In this context, "connect mechanically" is to be understood, in particular, to mean that mechanical energy is transmitted from the drive to the cover apparatus via the coupling mechanism.

It is expedient if the primary coupling apparatus is designed in such a way that the cover element in the first position is displaced at least partially in a vertical direction relative to the position of the cover element in the second position, the vertical direction being substantially perpendicular to the plug-in direction. An at least partial displacement in the vertical direction can be understood here to mean that the cover element must be displaced at least partially in a vertical direction from the first position relative to the second position. In particular, the center of gravity of the cover element is decisive in this regard. For example, such a displacement of the cover element from the first position relative to the second position in the vertical direction can be achieved by a rotation of the cover element and/or by a translational movement of the cover element, wherein the center of gravity of the cover element in the first position relative to the second position must have at least one displacement component which has a proportion in the vertical direction. There is therefore, in particular, no displacement of the cover element "at least partially in a vertical direction" when the cover element is displaced only in the plug-in direction. In particular, the vertical direction is substantially perpendicular to the plug-in direction. Here, "substantially perpendicular" should be understood to mean that the smaller enclosed angle between the vertical direction and the plug-in direction is between 80° and 90°, preferably between 85° and 90°, and particularly preferably between 88° and 90°. A particularly compact primary coupling apparatus in the plug-in direction can be achieved through the displaceability of the cover element from the first position relative to the second position—at least partially in the vertical direction.

The cover apparatus advantageously has a plurality of cover elements, in particular two cover elements. In other words, this can mean that the cover apparatus has not only one cover element but a multiplicity of cover elements. In this case, it is possible, in particular, for the cover elements to be designed as flaps, lamellar structures or other closure means. By providing a plurality of cover elements, the travel of the individual cover elements can be reduced, thus enabling a particularly rapid transfer of the cover elements from their respective first position into their respective second position. The plurality of cover elements is advantageously designed in such a way that, in the first state, the cover elements are not in contact with one another and, in the second state, they are in contact with one another. In particular, this can be achieved, for example, by the cover elements moving toward one another during the transfer from the first position into the second position. When using two cover elements, it is particularly space-saving if the cover elements are arranged in such a way that the center of gravity of the first cover element moves in the positive vertical direction from the first state into the second state, and the center of gravity of the second cover element moves in the negative vertical direction from the first state into the second state. A particularly compact and simple configuration of the cover elements is obtained if the first and the second cover element together form a jaw flap mechanism. Such a jaw flap mechanism is characterized, in particular, in that the cover elements provided in this case are pivotable relative to one another, in particular about a common pivot axis, and can be opened and closed in a jaw-like manner, like the upper jaw and lower jaw.

It is expedient if the cover apparatus, in particular the cover element or cover elements, has a seal, in particular a sealing lip. By providing a seal or a sealing lip, particularly good protection against environmental influences, such as rain or storms, and against a water jet of a high-pressure cleaner can be achieved. In this case, the seal is, in particular, arranged on the cover element in such a way that, in the first position, the seal only makes contact with the cover element, and, in the second position, the seal makes contact with a further element, in particular a further part of the cover apparatus. In other words, this can mean that the seal is, in particular, arranged in such a way that it is contactless in the exposed position and makes contact in the covering position.

The cover apparatus advantageously has a displacement apparatus, in particular a spreading apparatus or a scissor joint. In this context, a displacement apparatus is an apparatus by means of which, in particular, the mechanical energy transmitted by the coupling mechanism is transmitted from the drive to the cover apparatus. For example, this displacement apparatus can be a spreading apparatus, such as a linear guide or a slotted guide or a scissor joint. A scissor joint is distinguished, in particular, by two different legs, which are supported rotatably relative to one another at a common point, similarly to scissors.

In an advantageous embodiment, the displacement apparatus, in particular the scissor joint, is connected or makes contact indirectly and/or directly with the coupling mechanism. The unmediated and/or direct or indirect connection of the coupling mechanism to the displacement apparatus, in particular to the scissor joint, results in a particularly compact opening or transfer mechanism for the cover elements from the first position into the second position. It is particularly advantageous here if the displacement apparatus, in particular the scissor joint, forms a stop for the coupling mechanism. In other words, the maximum mobility of the coupling mechanism can be limited by the displacement apparatus. The maximum travel of the coupling mechanism can thereby be limited in a particularly compact manner.

It is expedient if at least one cover element, preferably all the cover elements, of the cover apparatus is/are mounted in such a way that it/they can rotate about an axis of rotation, the axis of rotation advantageously being substantially perpendicular to the plug-in direction and/or to the vertical direction. In other words, this can mean that at least one cover element is mounted in such a way that it can be rotated about an axis of rotation. In this case, the cover element can be designed as a flap rotatable about this axis of rotation, for example. In order to transmit a movement or mechanical energy from the drive to the cover element and to achieve rotatable displacement of the cover element, the coupling mechanism and the displacement apparatus in particular are used to transmit the mechanical energy from the drive to the cover element. The axis of rotation is advantageously at least substantially perpendicular to the plug-in direction and/or the vertical direction. Particularly compact construction of the primary coupling apparatus can thereby be achieved.

The plug element is advantageously mounted so as to be rotatable about a rotational axis, the rotational axis corresponding, in particular, to the axis of rotation. By virtue of the ability of the plug element to rotate about a rotational axis, it is possible to provide a particularly effective possibility of being able to compensate for certain positional tolerances or offsets, in particular in relation to a secondary coupling apparatus. As a result, the forces occurring during the coupling process of the primary coupling apparatus relative to the secondary coupling apparatus can be reduced and/or damage can be avoided or at least reduced. In this case, the plug element is advantageously preloaded in a centering position using centering preloading means, such as springs. In other words, this can mean that, although the plug element is mounted in such a way that it can be rotated about a rotational axis, the plug element is held in a central position by the preloading means, these preloading means exerting a centering effect. If the rotational axis and the axis of rotation coincide, it is possible for the plug element and the cover apparatus to be mounted in a particularly space-saving manner since this rotational axis and the axis of rotation can serve as a common rotational mounting axis both for the plug element itself and for the cover elements in relation to the plug element.

It is advantageous if at least one cover element, preferably all the cover elements, is/are preloaded into the first and/or into the second position by a preloading means, in particular a tension strap and/or a spring element. This achieves the advantage that at least one cover element, preferably all the cover elements, is/are in a defined state, even if the drive fails. For example, these cover elements can be preloaded relative to one another by the preloading means. In other words, this can mean that, in the case of a plurality of cover elements, the preloading means preload the cover elements relative to one another. For example, this can be achieved by two cover elements being mechanically connected to one another by a tension strap or a spring. It is particularly advantageous if the cover element or the cover elements are preloaded into the second position by the preloading means. It is thereby possible, in particular, to ensure that, in the event of a failure of the drive, the energy conducting contacts of the plug element continue to be protected against environmental influences. As an alternative preference, it is also possible for the cover element to be preloaded into the first position. In other words, this can mean that the preloading means are designed or arranged in such a way that the mechanical energy stored in the preloading means tends to transfer the cover element into the first position. This makes it possible, inter alia, to save energy since this allows the drive to be switched off in the first position when the primary coupling apparatus is coupled to the secondary coupling apparatus.

It is expedient if the primary coupling apparatus, in particular the plug element, has an activator and/or a guide pin which, both in the first position and in the second position, projects in the plug-in direction beyond at least one cover element, preferably beyond all the cover elements. In this context, projection of the activator and of the guide pin can be understood to mean, inter alia, that the activator and/or the guide pin project/s beyond the cover element in the plug-in direction, in particular away from the cover element. This ensures that the activator and/or the guide pin are/is permanently capable of interacting with other elements, irrespective of the position of the cover element in the first position or the second position. The guide pins are designed, for example, to be able to engage in guide recesses in order in this way to perform alignment of the primary coupling apparatus relative to the secondary coupling apparatus. The activator, on the other hand, is an element which serves to displace a covering element of a secondary coupling apparatus from a covering position into an opening or opened position, in particular in that the activator interacts with an actuating piece of the secondary coupling apparatus.

The plug element is advantageously mounted in such a way that the plug element can be moved in translation relative to the coupling mechanism or a part of the coupling mechanism in three axes which are perpendicular to one another, in particular with a maximum of +/− 0.5 mm, and/or wherein the plug element is mounted in such a way that the plug element can be moved in rotation relative to the coupling mechanism in three axes which are perpendicular to one another. In other words, this can mean that the plug element is mounted in such a way in relation to the coupling mechanism or a part of the coupling mechanism that the plug element can be displaced by a maximum of +/− 0.5 mm relative to at least a part of the coupling mechanism. By means of this relative displaceability, a certain compensation can be achieved between the plug element and the coupling mechanism. In other words, the plug element can therefore be displaced relative to the coupling mechanism in three spatial directions which are perpendicular to one another. Here, the decisive part of the coupling mechanism is, in particular, that part of the coupling mechanism which is connected directly to the drive. For example, the decisive part of the coupling mechanism in an embodiment in which the coupling mechanism comprises a piston rod extension is the piston rod. Alternatively or additionally, the plug element can also be mounted in such a way that it can be moved in rotation relative to the coupling mechanism in three axes which are perpendicular to one another. In other words, the plug element can be movable not only in translation in three spatial directions relative to a decisive part of the coupling mechanism, but also in rotation. A particularly high degree of adaptability of the plug element is thereby achieved, with the result that, when it is coupled to a plug connector of a secondary coupling apparatus, it can compensate for certain differences in height and/or rotational orientation. It is thereby also possible to ensure, in particular, that the main body of the primary coupling apparatus can be mounted in a fixed manner, thus making it possible to mount the primary coupling apparatus securely, e.g. on a fifth-wheel plate or a trailer.

A further aspect of the invention can relate to a secondary coupling apparatus, wherein the secondary coupling apparatus has a support arm, a plug connector and a covering element, wherein the covering element is designed to cover the plug connector in a covering position and to expose the plug connector in an exposed position or open position. The secondary coupling apparatus therefore forms as it were the counterpart to the primary coupling apparatus. The secondary coupling apparatus is therefore intended to be arranged on a commercial vehicle which is to be coupled to a commercial vehicle on which there is a primary coupling apparatus. In other words, this can mean that the primary coupling apparatus can be arranged on a towing vehicle or a trailer, and the secondary coupling apparatus can accordingly be arranged on a trailer or a towing vehicle. The secondary coupling apparatus has a support arm for fixing on a commercial vehicle. In addition, the secondary coupling apparatus also has a plug connector and a covering element. In particular, the plug connector has energy conducting contacts, which can be brought into energy conducting engagement with corresponding energy conducting contacts of the plug element of the primary coupling apparatus. The covering element of the secondary coupling apparatus serves to cover the plug connector in a covering position in such a way that a plug-in connection between the plug connector and the plug element of a primary coupling apparatus is not possible, and wherein the covering element can be displaced into an exposed position such that the plug connector is exposed in such a way that a plug-in connection between a plug element and the plug connector is possible. In other words, this can mean that the plug element covers or exposes the plug connector in such a way that a plug-in connection is not possible or is possible. This covering takes place, in particular, over an extended area and advantageously in such a way that all the energy conducting contacts of the plug connector are covered in their direction of extent by the covering element in the covering position and are exposed in such a way as to be visible from the outside in the exposed position or open position, in particular in the direction of extent of the energy conducting contacts. In other words, this can mean that, in the case of a covering position of the covering element, the energy conducting contacts of the plug connector are not visible and are visible in the exposed position. It is thereby possible to ensure that the secondary coupling apparatus and its energy conducting contacts are reliably protected against external environmental influences.

In an advantageous embodiment of the secondary coupling apparatus, the covering element and/or the plug connector are mounted rotatably relative to the support arm, in particular about a transverse direction, wherein advantageously the transverse direction in a coupled state is substantially parallel to the rotational axis and/or to the transverse axis. The transverse direction is, in particular, the direction in which the width of the vehicle on which the secondary coupling apparatus is mounted is dimensioned. As a result of the rotational mounting of the plug connector in relation to the support arm, it is possible to ensure that a certain compensating movement is also possible on the part of the secondary coupling apparatus. For this purpose, this has—compensating—rotatability, e.g. at least a possibility of rotation about the transverse direction. It is particularly preferred if this transverse direction is parallel or at least substantially parallel to the rotational axis and/or to the axis of rotation. Here, the decisive state in assessing the substantial parallelism of the transverse direction to the rotational axis or to the axis of rotation is the coupled state of the primary and secondary coupling apparatuses.

Advantageously, the secondary coupling apparatus, in particular the covering element, has an actuating piece, wherein the actuating piece is designed to interact with an activator of a primary coupling apparatus, wherein, as a result of this interaction, the covering element can be displaced from the covering position into the exposed position. In other words, this can mean that the actuating piece serves to interact with an activator of a primary coupling apparatus, in particular by direct contact, in such a way that a displacement of the covering element from the covering position into the exposed position is achieved by an approach of the secondary coupling apparatus relative to the primary coupling apparatus. In this case, the actuating piece can itself be part of the covering element or can be connected mechanically to the covering element. For example, the actuating piece can be attached laterally to the covering element.

In this case, the actuating piece advantageously has an engagement hollow for the activator. In other words, this means that the actuating piece can be designed as a female interaction element and the activator can be designed as a corresponding male interaction element.

The covering element of the secondary coupling apparatus is expediently a flap and/or comprises a flap. A particularly simple and lightweight covering element can thereby be achieved. In this case, a flap is, in particular, an element which is mounted rotatably about a rotational axis, it being possible for the flap to be displaced from the covering position into the exposed position by a rotational movement of this flap. In other words, the covering element can therefore be a rotary flap. Alternatively or additionally, the covering element can also be designed as a flap capable of translational displacement.

The covering element of the secondary coupling apparatus is expediently of multipart design. The covering element can be produced at particularly low cost.

It is expedient if the secondary coupling apparatus has a guide pin which projects beyond the cover element both in the covering position and in the exposed position. In other words, this can mean that the guide pin projects beyond the covering element both in the covering position and in the exposed position. It is thereby possible to ensure that a reliable interaction of the guide pin with a guide structure can take place even in the covering position. In this case, this guide structure is, in particular, part of a primary coupling apparatus. Advantageously, the guide pin is of at least partially rotationally symmetrical design, in particular in the direction in which the guide pin projects beyond the covering element.

Advantageously, the secondary coupling apparatus has no drive. A particularly low-cost and lightweight secondary coupling apparatus can thereby be achieved. A driveless secondary coupling apparatus is present, in particular, when the secondary coupling apparatus has no drive for displacing the plug connector of the secondary coupling apparatus.

A further aspect of the invention can relate to a fifth-wheel coupling arrangement. This fifth-wheel coupling arrangement comprises a primary coupling apparatus as described above and below, and a fifth-wheel plate, wherein the fifth-wheel plate has a semitrailer surface, wherein the semitrailer surface has an outward-pointing normal, wherein the plug element and/or the main body are/is advantageously mounted so as to be movable in a direction perpendicular to the plug-in direction, in particular in the direction of a normal to the semitrailer surface and/or in a direction perpendicular to the plug-in direction and to the normal, in particular by +/− 0.5 mm. In this case, the fifth-wheel coupling arrangement has a primary coupling apparatus and a fifth-wheel plate, wherein the primary coupling apparatus is connected, in particular directly or indirectly, to the fifth-wheel plate. The semitrailer surface of the fifth-wheel plate is designed so that, in a coupled state, a trailer rests on this semitrailer surface. In other words, this semitrailer surface can serve to at least partially support the semitrailer in a coupled state. Advantageously, in an ideal state, the outward-pointing normal is directed, in particular, substantially parallel to the vector of the gravitational acceleration. In other words, this can mean that the semitrailer surface can be aligned horizontally in this normal state. Advantageously, the plug element and/or the main body of the primary coupling apparatus are/is mounted so as to be movable in a direction perpendicular to the plug-in direction, in particular in the direction of the outward-pointing normal to the semitrailer surface, and/or in a direction perpendicular to the plug-in direction and to the normal. A particularly high degree of adaptability of the plug element and/or of the main body can thereby be achieved. The decisive factor here for the movability of the mounting is the movability of the plug element relative to the main body and/or relative to the fifth-wheel plate or the movability of the main body relative to the fifth-wheel plate. In particular, this displaceability is designed in such a way that it should be displaceable by at least +/− 0.5 mm. As an alternative preference or an additional preference, however, this movability should not be greater than 2 mm.

A further aspect of the invention can relate to an automatic coupling system which comprises a primary coupling apparatus, as described above, and/or a fifth-wheel coupling arrangement, as described above. In other words, the automatic coupling system can have a primary coupling apparatus and a secondary coupling apparatus and a fifth-wheel coupling arrangement as described above. The features and advantages presented above can therefore also be used analogously in this automatic coupling system, in particular for a commercial vehicle.

In an advantageous embodiment, the plug element of the primary coupling apparatus and the plug connector of the secondary coupling apparatus are arranged in the automatic coupling system in such a way that the plug element or the plug connector can each be displaced and/or rotated along or about three spatial directions, these three directions being perpendicular to one another. In other words, this can mean that the plug element or the plug connector are in this case arranged in such a way that, in the sum of the displaceability directions of the plug elements or of the plug-in connections, in each case at least the plug element or the plug connector can be displaced in one direction, and this displacement direction is formed by a total of three directions which are perpendicular to one another. For example, the primary coupling apparatus can therefore be designed in such a way that the plug element can be displaced in an X direction and the plug connector can be displaced in a Y and Z direction, the Y and Z directions in each case being perpendicular to the other direction and to the X direction. As an additional or alternative preference, this displaceability arrangement applies not only to the translational but also to the rotational movements. In other words, in the case of a rotatability of the plug element about an X axis, the plug connector can therefore be designed in such a way that it can be rotated about a Y axis and about a Z axis, the Y and Z axes in each case being perpendicular to one another and to the X axis. A particularly high degree of adaptability with regard to a compensating movement in the case of "imperfect" alignment of the plug element in comparison with the plug connector can be achieved through the ability to mount the plug element and the plug connector in this way.

In this case, preloading means, such as springs, are advantageously arranged on the plug element and/or on the plug connector or interact with these components in such a way that the plug element or the plug connector are each preloaded by these means so as to be centered in a central position in their possible displacement directions and/or directions of rotation.

BRIEF DESCRIPTION OF THE DRAWINGS

Further advantages and features of the present invention will be found in the following description with reference to the figures. Individual features of the illustrated embodiments can also be used in other embodiments, unless this has been expressly ruled out. In the drawings.

DETAILED DESCRIPTION OF THE PREFERRED EMBODIMENTS

Figure 1:
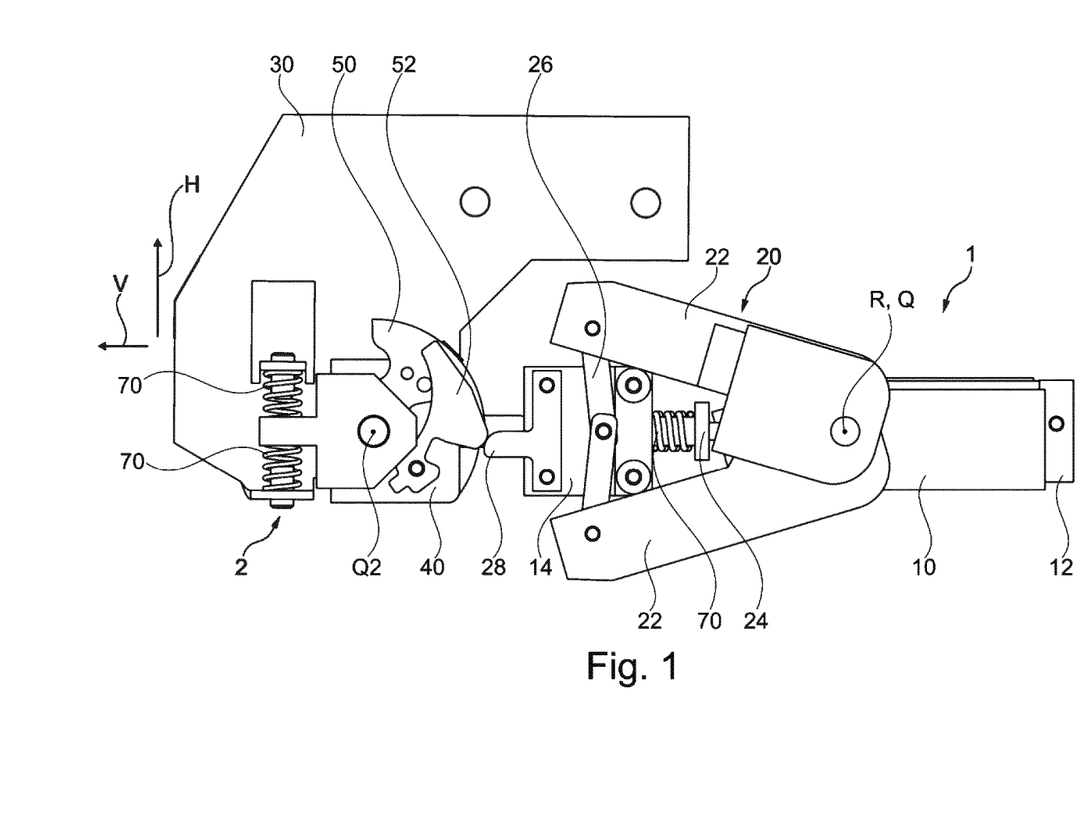
FIG. 1 is a side view of a primary coupling apparatus and of a secondary coupling apparatus.

FIG. 1 shows a primary coupling apparatus 1 and a secondary coupling apparatus 2. The primary coupling apparatus 1 has a main body 10 and at least one drive 12, the drive 12 in the illustrated embodiment being at least partially surrounded by the main body 10 and being fixed to this main body 10. In this case, the main body 10 is designed to be fixed to a fifth-wheel coupling arrangement and/or to a trailer, it being possible for this fixing to take place directly or indirectly. The drive 12 is mechanically connected to the cover apparatus 20 via the coupling mechanism 24. In the embodiment illustrated in FIG. 1, the coupling mechanism 24 is formed by a piston rod of the drive 12 and by a transmission element and a preloading means in the form of a spring 70 and makes contact with the scissor joint 26. The scissor joint 26 has two legs, which are connected to one another rotationally relative to one another at one point, the other end of the legs in each case being connected rotationally to a cover element 22. The cover elements 22 are mounted rotationally about the axis of rotation Q and the rotational axis R. In the embodiment illustrated, the cover elements 22 form a jaw flap mechanism with one another. The plug element 14 can be extended out of this jaw flap mechanism in the plug-in direction V by the drive 12 and the coupling mechanism 24. FIG. 1 shows the first position of the cover element 22, and therefore the plug element 14 is exposed in the illustrated embodiment or situation. In order to transfer the cover elements 22 from the first position (illustrated) into the second position (not illustrated), these cover elements 22 must be displaced relative to one another at least partially in the vertical direction H. The activator 28 projects beyond the cover elements 22 in the plug-in direction V, not only in the illustrated first position but also in the second position, which is not illustrated. The activator 28 serves to interact with the actuating piece 52 of the secondary coupling apparatus 2 in order in this way to achieve a displacement of the covering element 50. In this case, the covering element 50 is mounted rotationally about the transverse direction Q2, wherein, in the illustrated embodiment, the plug connector 40 of the secondary coupling apparatus 2 is mounted with respect to the support arm 30 in such a way as to be centered by means of the springs 70. Here, the transverse direction Q2 can be parallel to the axis of rotation Q and/or the rotational axis R.

Figure 2:
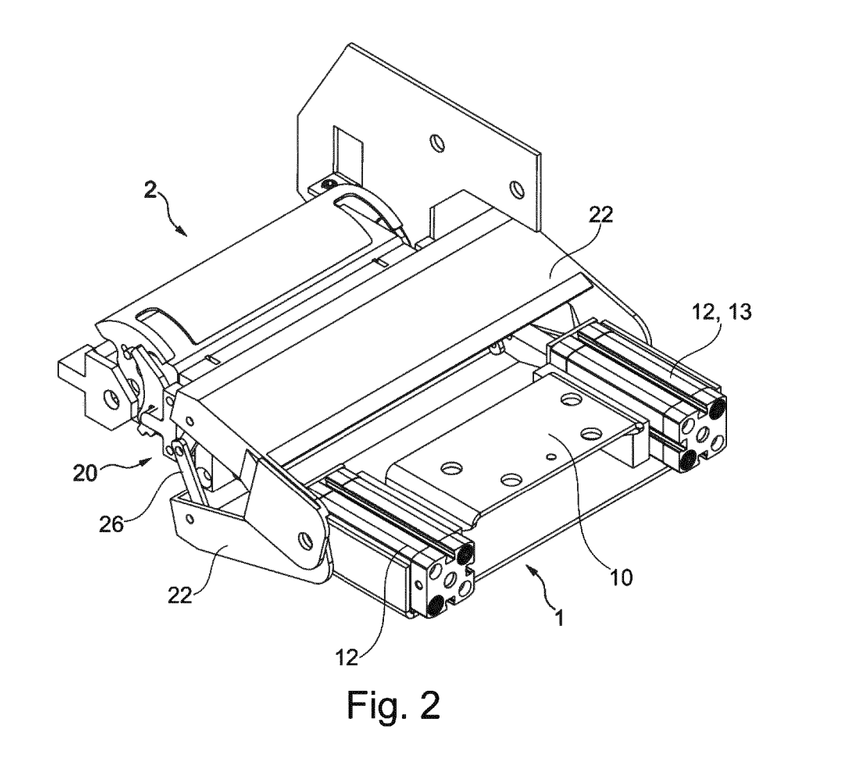
FIG. 2 is a parametric view of a primary coupling apparatus and of a secondary coupling apparatus.

FIG. 2 shows a parametric view of a primary coupling apparatus 1 and of a secondary coupling apparatus 2 shortly before coupling. The primary coupling apparatus 1 has a main body 10, to which drives 12 and 13 are fixed. The primary coupling apparatus 1 has two cover elements 22, which form a jaw flap mechanism, which can be actuated by means of a scissor joint 26. Here, this actuation takes place in such a way that one of the drives 12, 13 interacts mechanically with the cover apparatus 20 and its scissor joint 26 via a coupling mechanism 24 (not illustrated).

Figure 3:
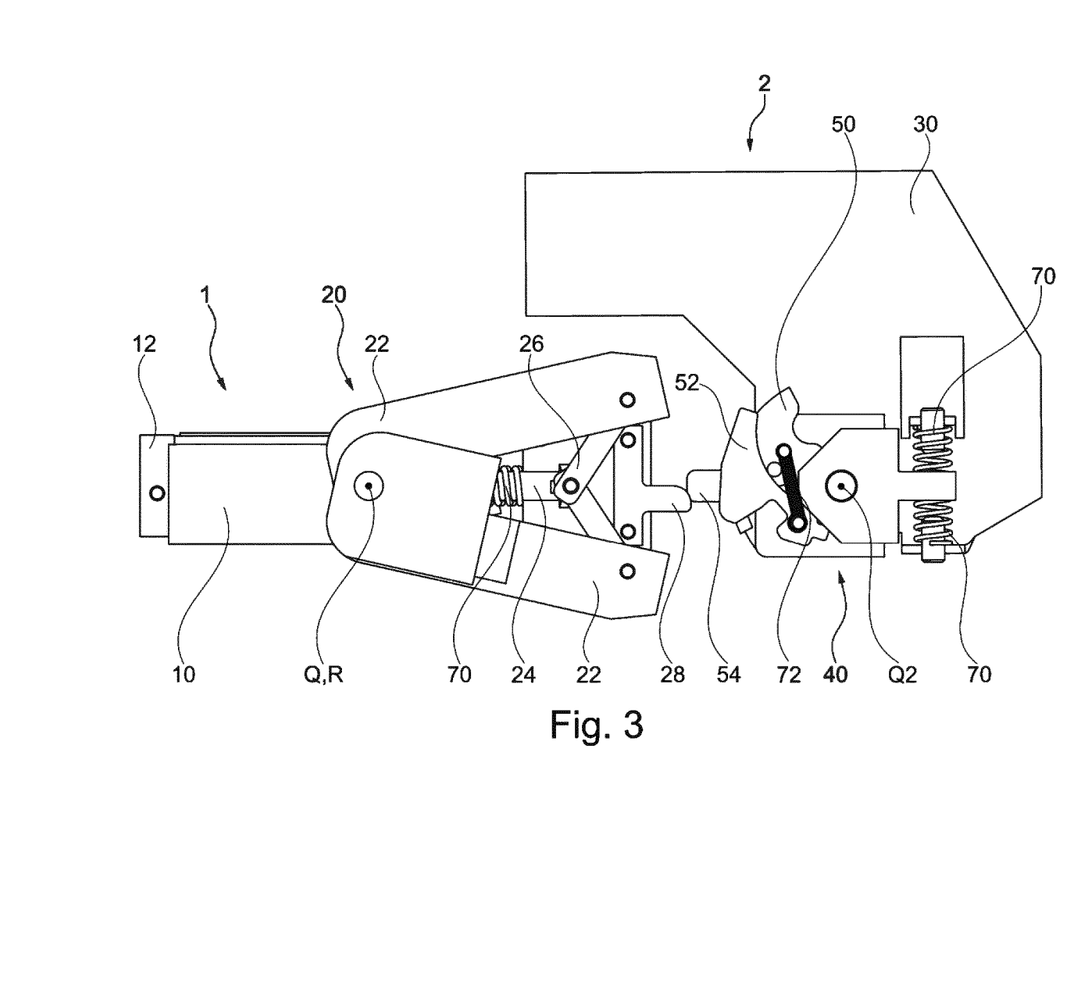
FIG. 3 is another view of a primary coupling apparatus and of a secondary coupling apparatus.

FIG. 3 shows another embodiment of a primary coupling apparatus 1 and a secondary coupling apparatus 2. In principle, this embodiment illustrated in FIG. 3 is similar to the embodiment illustrated in FIG. 1. In the embodiment illustrated in FIG. 3, however, the coupling mechanism 24 is formed by a piston rod which interacts mechanically directly with the scissor joint 26. Therefore, the coupling mechanism 24 of the embodiment illustrated in FIG. 3 is of single-part design. As can be seen from FIG. 3, the covering element 50 of the secondary coupling apparatus 2 is preloaded by means of a tension strap 72, with the result that this tension strap 72 preloads the covering element 50 into the covering position. In other words, this can mean that, if there were no further mechanical impediment, the tension strap 72 would transfer the covering element 50 into the covering position. The actuating piece 52 of the secondary coupling apparatus 2 has an engagement hollow and contact surfaces which are designed to make contact with the activator 28 of the primary coupling apparatus 1 in order in this way to achieve a displacement of the covering element 50 from the covering position into the exposed position. The secondary coupling apparatus 2 has at least one, preferably a plurality of, guide pins 54, which are designed to interact with guide structures of the primary coupling apparatus 1 in order in this way to achieve alignment of the primary coupling apparatus 1 relative to the secondary coupling apparatus 2.

Figure 4:
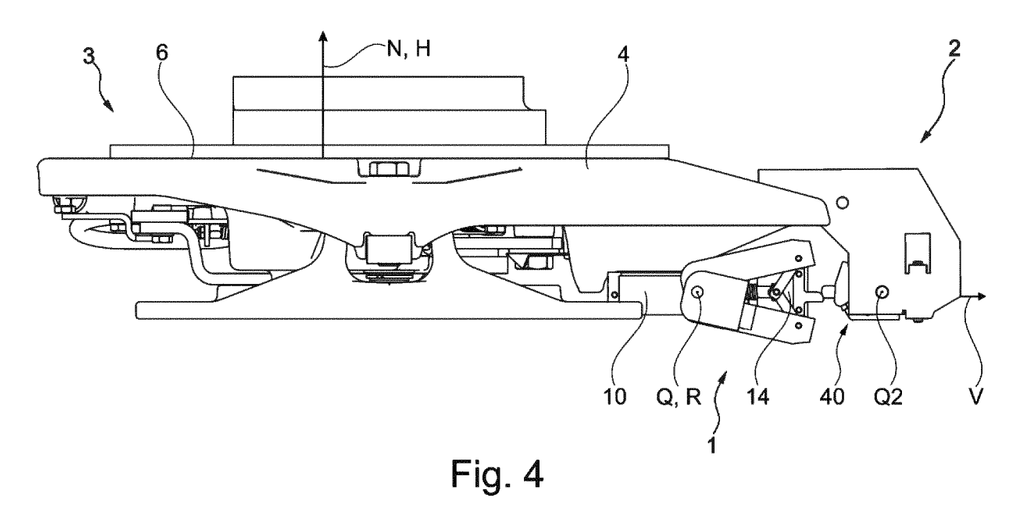
FIG. 4 is a view of a fifth-wheel coupling arrangement.

FIG. 4 shows a basic embodiment of a fifth-wheel coupling arrangement 3 and a secondary coupling apparatus 2, as well as a primary coupling apparatus 1. In other words, the embodiment illustrated in FIG. 4 can represent an automatic coupling system. The fifth-wheel coupling arrangement 3 has a fifth-wheel plate 4, which has a semitrailer surface 6. This semitrailer surface 6 has an outward-pointing normal N. In the embodiment illustrated, this outward-pointing normal N is substantially parallel to the vertical direction H. The primary coupling apparatus 1 is arranged on the fifth-wheel coupling arrangement 3. The primary coupling apparatus 1 has a main body 10 and a plug element 14. Here, this plug element 14 is intended to be connected to a plug connector 40 in such a way that energy can be exchanged between the primary coupling apparatus 1 and the secondary coupling apparatus 2. In this case, the secondary coupling apparatus 2 is designed in such a way that the plug connector 40 is mounted in such a way as to be rotatable about the transverse direction Q2.

LIST OF REFERENCE SIGNS

1—primary coupling apparatus
2—secondary coupling apparatus
3—fifth-wheel coupling arrangement
4—fifth-wheel plate
6—semitrailer surface
10—main body
12—drive
13—second drive
14—plug element
20—cover apparatus
22—cover element
24—coupling mechanism
26—scissor joint
28—activator
30—support arm
40—plug connector
50—covering element
52—actuating piece
54—guide pin
70—spring
72—tension strap
H—vertical direction
Q—axis of rotation
Q2—transverse direction
R—rotational axis
V—plug-in direction

The invention claimed is:

1. A fifth-wheel coupling arrangement comprising:
a primary coupling apparatus; and
a fifth-wheel plate;
wherein the fifth-wheel plate has a semitrailer surface;
wherein the semitrailer surface has an outward-pointing normal;
wherein the fifth-wheel plate has an insertion opening that extends in an insertion direction;
wherein the primary coupling apparatus comprises a main body, a drive, a coupling mechanism, a cover apparatus, and a plug element, and wherein the main body is configured to be fixed to at least one of the fifth-wheel coupling arrangement and the trailer;
wherein the plug element has energy conducting contacts which point in a plug-in direction;
wherein the drive is mechanically connected to the cover apparatus via the coupling mechanism;
wherein the cover apparatus has at least one cover element that is configured to be displaced by the drive between a first position and a second position;
wherein the plug element is exposed in the first position of the cover element and is covered in the second position of the cover element; and wherein the insertion direction is at least substantially parallel to the plug-in direction.

2. The fifth-wheel coupling arrangement as claimed in claim 1, wherein the plug element is configured to be displaced relative to the main body by the drive.

3. The fifth-wheel coupling arrangement as claimed in claim 2, wherein one energy conducting contact of the plug element is configured to be displaced in the plug-in direction.

4. The fifth-wheel coupling arrangement as claimed in claim 1, wherein the coupling mechanism is configured to be displaced by the drive in the plug-in direction.

5. The fifth-wheel coupling arrangement as claimed in claim 1, wherein the cover element is configured to be displaced from the first position relative to the second position at least partially in a vertical direction and wherein the vertical direction is substantially perpendicular to the plug-in direction.

6. The fifth-wheel coupling arrangement as claimed in claim 5, wherein the cover apparatus has a plurality of cover elements.

7. The fifth-wheel coupling arrangement as claimed in claim 6, wherein the plurality of cover elements includes two cover elements.

8. The fifth-wheel coupling arrangement as claimed in claim 1, wherein the cover apparatus includes a seal.

9. The fifth-wheel coupling arrangement as claimed in claim 8, wherein the seal comprises a sealing lip.

10. The fifth-wheel coupling arrangement as claimed in claim 1, wherein the cover apparatus includes a spreading apparatus or a scissor joint.

11. The fifth-wheel coupling arrangement as claimed in claim 1, wherein the cover element is preloaded into the first or into the second position by a preloader.

12. The fifth-wheel coupling arrangement as claimed in claim 11, wherein the preloader comprises at least one of: a tension strap and a spring.

13. The fifth-wheel coupling arrangement as claimed in claim 1, wherein the plug element has at least one of an activator and a guide pin which, both in the first position and in the second position, project in the plug-in direction beyond the at least one cover element.

14. The fifth-wheel coupling arrangement as claimed in claim 1, wherein at least one of the plug element and the main body are mounted so as to be movable in a direction perpendicular to the direction of a normal to the semi-trailer surface or in a direction perpendicular to the plug-in direction and to the normal.

15. The fifth-wheel coupling arrangement as claimed in claim 14, wherein the plug element or the main body are movable by plus or minus 0.5 millimeters (mm).

16. An automatic coupling system comprising the fifth-wheel coupling arrangement as claimed in claim 1, and further comprising:
   a secondary coupling apparatus;
   wherein the secondary coupling apparatus has a support arm, a plug connector, and a covering element; and
   wherein the covering element of the second coupling apparatus is configured to cover the plug connector of the second coupling apparatus in a covering position and to expose the plug connector of the second coupling apparatus in an exposed position.

17. The automatic coupling system as claimed in claim 16, wherein the plug element and the plug connector are arranged such that the plug element or the plug connector is configured to be displaced or rotated in three directions, and wherein the three directions are perpendicular to one another.

* * * * *